United States Patent Office 2,837,580
Patented June 3, 1958

2,837,580

TELOMERIZATION WITH SULFURYL HALIDE AND A SULFUR DIOXIDE MODIFYING AGENT

William S. Barnhart, Cranford, N. J., assignor, by mesne assignments, to Minnesota Mining and Manufacturing Company, St. Paul, Minn., a corporation of Delaware No Drawing. Application March 16, 1953
Serial No. 342,743

23 Claims. (Cl. 260—653)

This invention relates to an improvement in the method for the preparation of low molecular weight, halogen-containing telomers. In one aspect, this invention relates to an improvement in the method of preparing preparing liquid, grease and wax-like halotelomers containing halogen terminal groups, preferably chlorine.

Liquid, grease and wax-like telomers of fluoroethylenic and chlorofluoroethylenic compounds may be used in such capacities as plasticizers, rubber softeners, nonflammable hydraulic fluids, heat transfer media, lubricants, dielectric fluids and potting compounds.

For the purpose of this invention the term telomer means both homotelomers and cotelomers. The term homotelomer refers to those telomeric materials containing the same monomer units. The term cotelomers refers to those telomeric materials containing monomer units of two or more different monomers. The terms polymerization or telomerization in their broadest sense include both homopolymerization and copolymerization, and homotelomerization and cotelomerization, respectively.

Homotelomeric haloethylenic materials of an oil, grease or wax-like nature, but of different composition than those disclosed in this invention, have been prepared by telomerizing the haloethylenic monomer in the presence of telogens, such as chloroform and carbon tetrachloride, in mol ratios of about 9:1 with the monomer. By this prior art practice some liquid and oily telomeric materials have been obtained, but the major product of the telomerization is of a high molecular weight, non-distillable wax-like nature, which requires pyrolyzing to yield liquids, oils, or greases. These telomeric products of halogen substituted ethylene contain an odd number of carbon atoms as illustrated by the following formula:

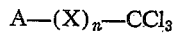
A—(X)$_n$—CCl$_3$ wherein A is chlorine or hydrogen and X is a haloethylenic monomer unit. The pyrolysis of these telomers must be carried out at extremely high temperatures and in a vacuum system to obtain a maximum yield of low molecular weight products. The major product of the pyrolysis is the gaseous monomer itself. Only 10 percent to 40 percent of the total yield of the pyrolysis is composed of the liquid, oil, grease and soft wax-like products. These products are unsaturated and therefore chemically unstable. To render the pyrolyzed fluoroethylenic and chlorofluoroethylenic products resistant to heat, light and chemical attack, fluorination of the unstable products with expensive reagents, such as cobalt trifluoride or chlorine trifluoride, is required.

Attempts, by the use of several chlorine donating compounds, to prepare telomers containing halogen terminal groups as set forth in this invention, have led to assorted products. For example, when chlorine gas was used as a telogen, only chlorination of the monomer resulted indicating that the chlorination took place at a speed in excess of the speed of the polymerization action. On the other hand with hydrochloric acid, the products obtained were primarily high molecular weight solids containing hydrogen terminal groups. Thionyl chloride yielded high molecular weight solids containing a chloride and also a —SOCl terminal group.

An object of the present invention is to provide distillable liquid or oil, grease and wax-like telomeric materials containing halogen terminal groups and a convenient and efficient method for making same.

Another object of this invention is to provide an improved method for preparing distillable liquid or oil, grease and wax-like perfluoroethyleneic and perchlorofluoroethylenic telomeric materials containing chlorine terminal groups, which require no further fluorination to render them stable to heat, light or chemical attack.

Another object of this invention is to provide an improved method for preparing distillable liquid, grease and wax-like telomeric materials by a one step process, the products of which may be separated and purified by convenient and conventional methods.

Still another object of this invention is to provide a method for preparing distillable and stable liquid, grease and wax-like telomeric materials which, without separation or further treatment, exhibit superior plasticizing properties.

Another object of this invention is to provide an improved method for preparing distillable liquid, oil, grease and wax-like telomeric materials in increased yield based upon the monomer charged.

Still another object of this invention is to provide homotelomers and cotelomers which contain an even number of carbon atoms.

Various other objects and advantages will become apparent to those skilled in the art from the accompanying description and disclosure.

The above objects are accomplished according to this invention by directly telomerizing a haloolefinic monomer or monomers with a catalyst and in the presence of a sulfuryl halide as the telogen, to produce a substantially saturated telomer. The telogen, namely the sulfuryl halide, provides halogen terminal groups, tends to control telomerization and modifies free radical reactions so that by varying the amount of telogen used, the telomeric material may be obtained primarily as a liquid or oil, a grease or a soft wax, which is recovered as the product of the process.

A preferred embodiment of this invention comprises the use of sulfur dioxide in combination with the sulfuryl halide.

The compounds formed by telomerization in the presence of a sulfuryl halide have the general formulae:

W—(X)$_n$—W wherein W is a member selected from the group consisting of fluorine, chlorine and bromine, X is a haloolefinic, preferably haloethylenic, monomer unit and $n$ is a number greater than one, preferably at least 4 and preferably not more than 20, and

W—(X,Y)$_n$—W wherein W is a member selected from the group consisting of fluorine, chlorine and bromine, X and Y are different haloolefinic, preferably ethylenic, monomer units and $n$ is an integer greater than one, and preferably not greater than 10.

The reaction occurs essentially as shown below in a typical reaction using chlorotrifluoroethylene and sulfuryl chloride as an example:

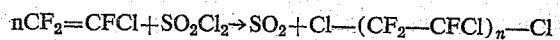
$nCF_2=CFCl+SO_2Cl_2 \rightarrow SO_2+Cl—(CF_2—CFCl)_n—Cl$

As shown, sulfur dioxide gas is formed as well as a clear polymeric mass, usually in gel-like form, which includes various grades of telomeric halocarbons, such as liquids, oils, greases and soft waxes. These telomeric halocarbons may be separated by conventional distillation. The distillable substances obtained by telomerizing chlorotrifluoroethylenic compounds in the presence of sulfuryl chloride are sufficiently stable so as not to absorb appreciable amounts of fluorine even though exposed to the gas for 24 hours at a temperature of 60° C. or to significantly decompose by pyrolysis at temperatures up to 200° C.

The halogen atoms of the sulfuryl halides are selected from the group consisting of fluorine, chlorine and bromine, and mixtures thereof. The preferred telogen, sulfuryl chloride, is usually prepared by the catalytic combination of sulfur dioxide and chlorine gas. Other sulfuryl halides useful in the present invention include $SO_2F_2$, $SO_2Br_2$, $SO_2FCl$, and $SO_2BrCl$.

Generally accepted among those skilled in the art is the concept that compounds which homopolymerize or homotelomerize are those that contain $=CH_2$ and/or $=CF_2$ groups. It is also well known that compounds which will not readily homopolymerize or homotelomerize may be copolymerized or cotelomerized with other monomers. The haloolefinic compounds which may be used as starting monomers in the present invention are any polymerizable compounds containing a double bond between two carbon atoms and at least one halogen atom attached to at least one of the carbon atoms attached to the double bond. The halogen attached to the carbon of the double bond may be fluorine, chlorine, bromine or iodine. Experimental evidence has shown that compounds containing a halogen attached to one of the carbon atoms attached to the double bond is sufficiently stable to halogenation that it may be successfully telomerized according to the teachings of this invention. Styrene and acrylonitrile, on the other hand, when subjected to similar conditions yielded the chlorinated monomers.

The present invention is particularly applicable to the telomerization of perfluorochloro olefins, such as chlorotrifluoroethylene, perfluoro olefins, such as tetrafluoroethylene, chloro olefins, such as vinyl chloride, and fluoro olefins, such as vinylidene fluoride. The invention contemplates the telomerization of various polymerizable halogenated olefins; for example, perfluorobutadiene, α-methyl phenyldifluoroethylene, difluorodichloroethylene, perfluoroacrylonitrile, phenyl perfluoroethylene, perfluorocyclobutene, perfluorocyclobutadiene, α-chlorostyrene, 2-chloropropene, vinylidene chloride, vinyl bromide, tetrachloropropene, chlorobutadiene, α-bromostyrene, bromotrifluoroethylene, unsym. dibromodifluoroethylene, trifluoroethylene, vinyl fluoride, etc. As previously mentioned, the present invention applies to the cotelomerization of these monomers, as well as their homotelomerization. For example, the invention applies to the cotelomerization of chlorotrifluoroethylene and tetrafluoroethylene. In the cotelomerization, the second monomer or comonomer is a halogented olefin, and preferably an olefin in which the halogen is selected from a group consisting of fluorine and chlorine. The monomers may also be cotelomerized with a wide range of compounds which do not readily homopolymerize or homotelomerize. For example, the invention contemplates the cotelomerization of compounds of the nature of sym. dichlorodifluoroethylene and trichloroethylene incorporated with such compounds as chlorotrifluoroethylene and tetrafluoroethylene.

It is also within the scope of this invention that unsaturated bonds which may exist in the product after the telomeric chains have been formed may be halogenated by the telogen. This is to be expected when diolefins, such as perfluorobutadiene, are used as starting materials. It is also within the scope of this invention that a halogen, such as iodine, of the monomer unit may be replaced with another halogen donated by the telogen.

The present invention is not limited to use in any one particular type system or apparatus. In one aspect the telomerization may be carried out by means of a batch process which comprises telomerizing the monomer in the presence of a catalyst, a sulfuryl halide and free sulfur dioxide, and an inert solvent, if desired, under autogenous pressure.

More particularly, a system designed to withstand moderate pressures, which are autogenous during the telomerization, is flushed out with nitrogen to remove any oxygen and susequently charged with the catalyst, preferably benzoyl peroxide, a telogen, preferably sulfuryl chloride, and a solvent, if desired. The system is closed and the haloethylenic monomer, or monomers, is added as a gas under pressure or as a liquid at low temperatures. The mixture is then heated to a temperature between about 0° C. and about 200° C. and preferably between about 25° C. and 150° C. During the telomerization some type of agitation is preferable but not essential. As the telomerization proceeds, a maximum pressure is soon reached which subsequently slowly subsides. When the pressure ceases to drop, the heat is discontinued and the gaseous materials, such as unreacted monomer, which may be present are bled from the autoclave. These may, if desired, be fractionated to separate and recover free sulfur dioxide and unreacted monomer. The product of the telomerization is stripped of the excess sulfuryl chloride, solvent and chlorinated monomer, by heating. Acidic impurities are then removed from the remaining telomeric material by such methods as treatment with silica gel, alumina, activated carbon or washing it with aqueous ammonia or alkali. The product may then be distilled if individual fractions are desired.

In another embodiment of the invention, the telomerization may be carried out by means of a continuous process comprising feeding the reactants into a reaction zone at a rate determined to maintain consistent proportions of the constituents in the mixture and to produce a residence time of about ½ hour to 24 hours, preferably 1 to 6 hours. The apparatus may be modified so that each ingredient is added individually, or the catalyst may be dissolved in the sulfuryl chloride, or each may be dissolved in a suitable solvent, or the catalyst and the sulfuryl chloride may exist in the same solution.

More particularly in a continuous system, reagent tanks for the catalyst, sulfuryl chloride and the monomer, pipe coil reactor in a heating bath and a cooling coil leading to a product storage tank are used. Nitrogen pressure may be applied to the reagent tanks or to the units as desired.

Yields, usually above 70 percent and frequently approaching 100 percent based upon the weight of monomer charged, of chlorotrifluoroethylene homotelomers and tetrafluoroethylene homotelomers have been prepared by the operation of the above procedure.

The mol ratio of sulfuryl chloride to monomer employed in these procedures is between about 2:1 and about 1:10, preferably between 1:1 and 1:4 depending upon the products desired and the starting materials used. The optimum mol ratio, for producing primarily telomeric chlorotrifluoroethylene oils and greases, is 1:2 of the telogen to monomer. The telomerization may be carried out in the presence of a suitable inert solvent, if desired. The term inert solvent means any liquid which does not materially alter the normal telomerization of haloethylenic compounds in the presence of sulfuryl chloride; such as Freon 113 (1,2,2-trifluorotrichloroethane), tetrachloroethylene, carbon tetrachloride, or tetrachloroethane. It should be noted that water slowly reacts with sulfuryl chloride to form hydrochloric acid and sulfuric acid and therefore precautions should be taken to provide substantially anhydrous conditions. Glass lined equipment is usually desirable, however, monel and stainless steel have been used for polymerization and filtration apparatus without noticeable corrosion.

Polymerization catalysts which are not destroyed by halogenation at temperatures within the operating range and which are soluble in one or more of the constituents of the telomerization mixture may be used in the practice of this invention. For example, the telomerization may be carried out by catalysis with aromatic peroxides, such as benzoyl peroxide, chlorinated aromatic peroxides, such as dichlorobenzoyl peroxide, aliphatic peroxides, such as di-t-butyl peroxide, chlorinated aliphatic peroxides, such as trichloroacetyl peroxide, metal compounds, such as tetraethyl lead, gases, such as oxygen, and sunlight.

The preferred embodiment of this invention comprises the addition of 0.1 to 10 and preferably 0.33 to 3 moles of sulfur dioxide per mole of catalyst to the telomerization mixture. It has been found that the addition of sulfur dioxide at the initiation of the telomerization substantially increases the yield of telomer formed and insures a water-white product.

Although we do not limit our invention to this mechanism, it is presumed that the advantages derived from the addition of sulfur dioxide to the telomerization mixture may be contributed to its identity as an anhydride, a reducing agent and one of the components of the sulfuryl halide dissociation equilibrium.

In the capacity of an anhydride sulfur dioxide combines with any water which may be present in the telomerization mixture, thus restricting the double decomposition of sulfuryl chloride to form hydrochloric acid and sulfuric acid. As a reducing agent it prevents the adverse effect of oxidized metallic ions, particularly ferric ions, which may be present. It is well known that ferric ions not only color the telomers, but also greatly accelerate the degradation of peroxide catalysts in the presence of sulfuryl halides. Sulfur dioxide also combines with any free halogen which may be present in the sulfuryl halide thus forming additional sulfuryl halide. Although sulfur dioxide is produced during telomerization, with sulfuryl halide, its concentration is not sufficiently high, particularly during the initial stages, to bring about the desired results.

In addition to the above cited advantages produced by adding sulfur dioxide to sulfuryl chloride-containing telomerization mixtures, the sulfur dioxide provides, independently of the telogen, a reducing modifier for promoting the organic peroxide catalysts employed in non-aqueous polymerizations or telomerizations.

Haloethylenic telomers, telomerized with $SO_2Cl_2$, contain only negligible amounts of sulfur, generally less than 0:1 percent. In the case of chlorotrifluoroethylene telomers, the four-carbon and six-carbon compounds have been isolated from sulfuryl chloride modified oil and the end carbon groups of these compounds have been identified as —$CF_2Cl$ and —$CFCl_2$. The four-carbon compound has a boiling point of 137° C., $N_D^{20}$ of 1.380, $d_4^{20}$ of 1.72 and M. R. (observed) of 41.0 versus a calculated 40.1 for $C_4Cl_4F_6$. The six-carbon compound has a boiling point of 207° C., $N_D^{20}$ of 1.385, $d_4^{20}$ of 1.82 and M. R. (observed) of 54.3 versus a calculated 52.2 for $C_6Cl_5F_9$.

Although liquid, oily and greasy homotelomers of chlorotrifluoroethylene and cotelomers of chlorotrifluoroethylene and tetrafluoroethylene may readily be prepared by telomerizing in the presence of sulfuryl chloride, telomers of tetrafluoroethylene appear primarily in a soft wax-like condition. It should be borne in mind that telomers of tetrafluoroethylene containing as few as five monomer units are solids or waxes at room temperature. The homotelomers of tetrafluoroethylene are, however, compatible with both chlorotrifluoroethylene polymers and polytetrafluoroethylene molding powder. Cotelomers of chlorotrifluoroethylene and tetrafluoroethylene range in state from liquid to solids, depending upon the mol ratio of the monomers and upon the amount of telogen, preferably sulfuryl chloride, employed during the telomerization. Cotelomers of these compounds containing 10 percent chlorotrifluoroethylene and 90 percent tetrafluoroethylene are liquids and oils, while 99 percent tetrafluoroethylene are soft wax-like solids.

Liquid homotelomers of 1,1-dichloro-2,2-difluoroethylene and liquid and solid telomers of vinyl chloride have also been obtained by telomerization in the presence of sulfuryl chloride.

Low molecular weight chlorotrifluoroethylene homotelomers have successfully been used as plasticizers in plastics derived from similar starting materials. Until recently, these plasticizers consisted of a fraction of the total polymeric mass, which contained assorted low molecular weight polymeric materials boiling within a temperature range of about 50° C. An improved plasticizer was obtained when the components of the plasticizer were not limited to those materials boiling within such a restricted temperature range, but included all of the polymeric materials boiling above 200° C. at 760 mm. and in such proportions that the average molecular weight lay between 200 and 2000. Uncracked polymeric material telomerized with carbon tetrachloride or chloroform in mol ratios as high as 100:1 with the monomer, exhibit average molecular weights in excess of the optimum range and the total material boiling above 200° C. cannot be used as plasticizer until cracked and stabilized.

The chlorotrifluoroethylenic plastic containing 25 percent of the $SO_2Cl_2$ modified plasticizer is transparent, does not exude plasticizer after one week and does not whiten when severally folded or flexed. The plasticizer has been found to be as efficient as other plasticizers at room temperature and more efficient at low temperatures. It is also less volatile and more compatible with the plastic than plasticizers prepared by other methods.

To facilitate a fuller and more complete understanding of the subject matter of this invention and how the herein described invented compounds can be prepared by practice of the invented process, certain specific examples herewith follow, but it is to be understood that these examples are provided by way of illustration and should not be considered unnecessarily limiting to the invention.

Wherever the term "parts" is used, it is intended to mean "parts by weight."

TELOMERIZATION OF CHLOROTRIFLUOROETHYLENE

Example 1

The pressure system was flushed out with nitrogen and charged with a peroxide solution (3.5 parts of benzoyl peroxide dissolved in 308 parts of carbon tetrachloride) and 135 parts of sulfuryl chloride. The system was cooled to about —25° C. or lower and 116 parts of chlorotrifluoroethylene monomer was added. The system was closed and heated to about 95° C. for a period of four hours during which time the mixture was mechanically agitated. A maximum gage pressure of 300 pounds per square inch was reached and then gradually subsided. At the end of the telomerization the gases were bled from the system and the liquid product was transferred to a distilling pot. The excess sulfuryl chloride and carbon tetrachloride (solvent) were boiled off by heating the mixture to a pot temperature of 165° C. at atmospheric pressure. The gel-like product was distilled at a vapor temperature up to 175° C. at 35 mm. of mercury to remove very low molecular weight polymers. Final distillation was conducted at 0.5 mm. pressure and at a vapor temperature up to about 230° C. The telomerization yield was 78 percent with 93 percent of the product distilled.

TELOMERIZATION OF CHLOROTRIFLUOROETHYLENE

Example 2

5.3 parts of benzoyl peroxide containing 10 percent water were dissolved in 50 parts of Freon 113. The solution was filtered to remove water. After flushing the polymerization system with nitrogen, the peroxide solution and 135 parts of sulfuryl chloride and 350 parts of chlorotrifluoroethylene were charged into the pressure vessel. Telomerization was conducted for four hours at a temperature of 100° C. At the end of the telomerization, the gases recovered from the pressure system were found to contain 11 parts of unreacted monomer and 25 parts of sulfur dioxide. Distillation of the liquid product at a temperature of about 100° C. yielded 75 parts Freon 113 and 43 parts unreacted sulfuryl chloride. The remaining 330 parts (95 percent yield) of the telomeric product and 33 parts (10 weight percent of anhydrous silica gel) were heated to a temperature of 75° C. and then filtered. The final distillation up to a temperature of 235° C. at 0.1 mm. pressure fractionated the telomeric mixture so that 10 percent of the product was distilled below a temperature corresponding to 200° C. at atmospheric pressure, 50 percent was distilled between temperatures corresponding to 200° C. and 500° C. at atmospheric pressure and 40 percent remained undistilled. The melting point of the residue was 96° C.

TELOMERIZATION OF TETRAFLUOROETHYLENE

Example 3

A silver lined bomb was flushed out with nitrogen, cooled to about 0° C. and charged with 57 parts of sulfuryl chloride and .844 part benzoyl peroxide. The system was then closed and 42.2 parts of tetrafluoroethylene were charged under pressure into the reactor. The mixture was heated to a temperature of 95° C. and the gage pressure soon reached a maximum of 500 pounds per square inch which subsided to 250 pounds per square inch during a period of one hour. The low boiling constituents of the telomerization product were stripped off by opening the system and heating the mixture to a temperature of about 100° C. The product was then treated with silica gel to remove the acidic impurities and distilled to yield 4.22 parts of liquid (B. P. 100° C. to 200° C.), 8.44 parts of a soft wax (B. P. 200° C. to 300° C.) and 3.37 parts residue (M. P. 80° C.). The waxy telomer was compatible with chlorotrifluoroethylene polymer at 25 percent concentration and appeared to plasticize tetrafluoroethylene molding powder in 33 percent loadings. A gray translucent tetrafluoroethylene plaque was pressed at 325° C. and 15,000 pounds per square inch.

COTELOMERIZATION OF CHLOROTRIFLUOROETHYLENE AND TETRAFLUOROETHYLENE

Example 4

The pressure system was flushed with nitrogen, cooled to −30° C. and charged with 1.1 parts benzoyl peroxide, 49.5 parts sulfuryl chloride and 32.2 parts chlorotrifluoroethylene. The system was closed and 18.35 parts of tetrafluoroethylene were charged under pressure into the reactor. The mixture was then heated to a temperature of 95° C. and a maximum gage pressure of 450 pounds per square inch was reached. The product of the telomerization was treated with silica gel and distilled to yield 21.1 parts of liquid cotelomer.

TELOMERIZATION OF 1,1-DICHLORO-2,2-DIFLUOROETHYLENE

Example 5

45.6 parts of 1,1-dichloro-2,2-difluoroethylene were telomerized with 49.6 parts of sulfuryl chloride and 4.72 parts of benzoyl peroxide at 100° C., by the method described above. Upon distillation, a liquid fraction (B. P. 40° C. to 100° C. at 0.1 mm.) and a residue were obtained.

TELOMERIZATION OF VINYL CHLORIDE

Example 6

A pressure system was flushed with nitrogen and charged with 0.72 part benzoyl peroxide and 80.3 parts of sulfuryl chloride. The system was then cooled and 18 parts of vinyl chloride were added. The system was closed, allowed to reach room temperature and agitated for 4 hours. The products recovered consisted of liquid and low molecular weight telomers.

VARIABLES IN CHLOROTRIFLUOROETHYLENE TELOMERIZATION

Example 7

The effect of varying the concentration of solvent, modifier or catalyst in the telomerization of chlorotrifluoroethylene with sulfuryl chloride is illustrated in the following Table I:

TABLE I.—VARIABLES INVOLVED IN THE TELOMERIZATION OF CHLOROTRIFLUOROETHYLENE

| | Effect of Solvent | | | Effect of Modifier | | | Effect of Catalyst | | |
|---|---|---|---|---|---|---|---|---|---|
| Run No. | 1 | 2 | 3 | 4 | 5 | 6 | 7 | 8 | 9 |
| TFCE, mols | 3 | 3 | 3 | 3 | 3 | 3 | 3 | 3 | 3 |
| SO$_2$Cl$_2$, mols | 1.5 | 1.5 | 1.5 | 1.0 | 1.5 | 2.0 | 1.5 | 1.5 | 1.5 |
| CCl$_4$, mols | 0 | 1.0 | 2.0 | 0.5 | 0.5 | 0.5 | 0.5 | 0.5 | 0.5 |
| BzO$_2$, mols.[1] | .03 | .03 | .03 | .03 | .03 | .03 | .015 | .03 | .06 |
| Yield, percent | 45 | 76 | 77 | 71 | 79 | 91 | 61 | 79 | 88 |
| Boiling Point of Fraction at Atmospheric Pressure: | | | | | | | | | |
| below 300° C. percent comp. | 30.8 | 27.0 | 29.3 | 16.6 | 32.0 | 34.4 | 23.3 | 28.5 | 34.0 |
| 350° C. percent comp. | 12.6 | 6.0 | 4.0 | 10.3 | 11.4 | 8.1 | 5.5 | 13.5 | 9.1 |
| 400° C. percent comp. | 13.1 | 14.5 | 5.2 | 7.5 | 10.7 | 11.9 | 13.5 | 8.9 | 10.1 |
| 450° C. percent comp. | 11.1 | 11.5 | 8.2 | 9.6 | 11.8 | 11.3 | 12.7 | 12.6 | 11.8 |
| 500° C. percent comp. | 13.1 | 10.4 | 18.0 | 8.8 | 8.0 | 8.5 | 12.5 | 12.0 | 8.8 |
| 550° C. percent comp. | 6.8 | 10.6 | 7.3 | 8.5 | 9.8 | 12.6 | 9.4 | 4.5 | 6.4 |
| above 550° C. percent comp. | 12.5 | 20.0 | 27.0 | 38.7 | 16.3 | 13.2 | 23.1 | 20.0 | 19.8 |

[1] Based on monomer charged.

Example 8

This example illustrates the effect of the addition of 0.05 part of sulfur dioxide to a typical continuous telomerization of chlorotrifluoroethylene. 582.5 parts of monomer, 536 parts of sulfuryl chloride, 199.6 parts carbon tetrachloride and 9.95 parts of benzoyl peroxide were charged per hour to a reactor, which was maintained at a pressure of 350 p. s. i. and at a temperature between 195° F. and 215° F. The results of this telomerization are tabulated below:

| Amount of Sulfur Dioxide, Percent Added | Yield, Percent [1] | Product Color |
|---|---|---|
| 0.00 | 88 | good. |
| 0.00 | 88 | Do. |
| 0.05 | [2] >100 | excellent. |
| 0.05 | [2] >100 | Do. |

[1] Based on weight of chlorotrifluoroethylene charged.
[2] The additional weight of the chlorine terminal groups contribute the weight in excess of 100%.

Example 9

A series of material balance runs were made with a pilot unit. The usual equipment was modified to include a bypass in the gas outlet from the receiver. This bypass contained a system for taking gas samples, two Dry Ice-cooled traps for condensable gases, and a wet-test meter for measuring noncondensable gases.

The chosen operating conditions were maintained with a unit pressure of 350 p. s. i., feed pressure of 375 p. s. i., first and second polymerizer bath temperatures of 210° F. and 195° F., and a contact time of about four hours.

The hourly charge to the unit is shown below:

|  | Parts by weight |
|---|---|
| $CF_2=CFCl$ | 582.5 |
| $SO_2Cl_2$ | 536.0 |
| $CCl_4$ | 182.4 |
| Benzoyl peroxide | 9.93 |
| $SO_2$ | 24.00 |

For timing, the unit was operated for 20 hours as a run-in period. Then three four-hour material balance runs were made. Another 12-hour run-in period was followed by two four-hour material balance runs. Finally, a 16-hour run-in period was made at a reduced charge rate followed by one four-hour material balance run with a contact time of 6–7 hours.

During each four-hour material balance run, the following data were gathered: volume of monomer charged, volume of catalyst solution charged, volume of non-condensed gases obtained, weight of condensed gases obtained, and weight of liquid product obtained. In addition, gas samples were taken at the end of the first and third hour. The volume of non-condensed gases proved to be insignificant and amounted to 0.1–0.2 cu. ft./4 hours.

All data are summarized in Table 2. The conversions of volume to weight are based on a determined density of catalyst solution of 1.64 at 24° C. and the reported density of monomer of 1.30 at 24° C.

TABLE II.—MATERIAL BALANCE

| Run No. | 1 | 2 | 3 | 4 | 5 | 6 |
|---|---|---|---|---|---|---|
| Contact time, hr | 4.5 | 4.5 | 4.5 | 4.5 | 4.5 | 6.5 |
| Elapsed time, hr | 4 | 3.33 | 4 | 4 | 4 | 4 |
| Monomer, liters | 1.67 | 1.15 | 1.65 | 1.75 | 1.64 | 0.87 |
| Monomer, grams | 2,170 | 1,495 | 2,145 | 2,270 | 2,130 | 1,130 |
| Cat. soln., liters | 1.90 | 1.42 | 1.65 | 1.83 | 1.75 | 1.10 |
| Cat. soln., grams | 3,120 | 2,330 | 2,705 | 3,000 | 2,870 | 1,805 |
| Total charge, grams | 5,290 | 3,825 | 4,850 | 5,270 | 5,000 | 2,935 |
| Gas prod., grams | 900 | 665 | 683 | 810 | 756 | 417 |
| Liquid prod., grams | 4,392 | 3,692 | 4,349 | 4,462 | 4,273 | 2,481 |
| Total prod., grams | 5,292 | 4,357 | 5,032 | 5,272 | 5,029 | 2,898 |
| Recovery, percent | 100 | 118 | 104 | 100.0 | 100.5 | 99.0 |

It is to be understood that various modifications and alterations of conditions and technique obvious to those skilled in the art may be made in this invention without departing from the scope thereof. To a large extent the conditions of telomerization will depend upon the olefin being telomerized and upon the technique used. For example, with perfluoroethylenes and perfluorochloroethylenes temperatures between about 80° C. and about 125° C. are most satisfactory. In a continuous system somewhat lower residence times are employed than in batch type systems because lower yields are permissible with recycle of unreacted monomer. In autogenous batch type systems the residence time is about 2 to 5 hours, but this depends to a large extent upon the monomer used, and may be as short as 10 minutes without departing from the scope of this invention.

Having described my invention, I claim:

1. A process for the production of a distillable open chain telomer which comprises telomerizing a substituted ethylene containing at least one halogen atom attached to at least one of the double bonded carbon atoms under liquid phase and substantially anhydrous conditions with a sulfuryl halide telogen, the halide substituents of said telogen being selected from at least one of the group consisting of fluorine, chlorine and bromine, in the presence of sulfur dioxide as a modifying agent.

2. The process of claim 1 in which said sulfuryl halide is sulfuryl chloride.

3. The process of claim 1 in which said sulfuryl halide is sulfuryl fluoride.

4. The process of claim 1 in which said sulfuryl halide is sulfuryl bromide.

5. The process of claim 1 in which said sulfuryl halide is fluoro sulfuryl chloride.

6. The process of claim 1 in which said sulfuryl halide is bromo sulfuryl chloride.

7. A process for the production of a distillable open chain telomer which comprises telomerizing a substituted ethylene containing at least one halogen atom attached to at least one of the double bonded carbon atoms at a temperature between about 0° and about 200° C. for a period of time between about ½ hour and about 24 hours under liquid phase and substantially anhydrous conditions with a sulfuryl halide telogen, the halide substituents of said telogen being selected from at least one of the group consisting of fluorine, chlorine and bromine, in the presence of a catalyst effective under the conditions of telomerization to promote the telomerization and in the presence of sulfur dioxide as a modifying agent.

8. The process of claim 7 in which the mol ratio of sulfuryl halide to monomer is between about 1:10 and about 2:1 and the mol ratio of the sulfur dioxide to the catalyst is between about 1:10 and about 10:1.

9. A process for the production of a distillable open chain telomer which comprises telomorezing a substituted ethylene containing at least one halogen atom attached to at least one of the double bonded carbon atoms at a temperature between about 25° C. and about 150° C. for a period of time between about 1 and about 6 hours under liquid phase and substantially anhydrous conditions with a sulfuryl halide telogen, the halide substituents of said telogen being selected from at least one of the group consisting of chlorine, fluorine and bromine, said telogen being present in a mol ratio of between about 1:1 and about 1:4 with monomer in the presence of a catalyst effective under the conditions of polymerization to promote the telomerization and in the presence of added sulfur dioxide as a modifying agent said sulfur dioxide being present in a mol ratio of between 3:1 and 1:3 with the catalyst.

10. A process for the production of a distillable open chain homotelomer which comprises homotelomerizing a substituted ethylene containing two fluorine atoms attached to at least one of the double bonded carbon atoms at a temperature between about 0° C. and about 200° C. for a period of time between about ½ hour and about 24 hours under liquid phase and substantially anhydrous conditions with sulfuryl chloride as a telogen in a mol ratio between about 1:10 and about 2:1 with monomer in the presence of a catalyst effective under the conditions of telomerization to promote the telomerization in the presence of added sulfur dioxide as a modifying agent in a mol ratio between about 1:10 and about 10:1 with the catalyst to produce a distillable open chain homotelomer and recovering the homotelomer thus produced.

11. The process of claim 10 in which said polymerizable compound is trifluorochloroethylene.

12. The process of claim 10 in which said polymerizable compound is tetrafluoroethylene.

13. The process of claim 10 in which said polymerizable compound is unsymmetrical dichlorodifluoroethylene.

14. The process of claim 10 in which said polymerizable compound is vinyl chloride.

15. The process of claim 10 in which the homotelomerization is conducted in the presence of trifluorotrichloroethane as a solvent.

16. The process of claim 10 in which the homotelomerization is conducted in the presence of tetrachloroethylene as a solvent.

17. The process of claim 10 in which the homotelomerization is conducted in the presence of tetrachloroethane as a solvent.

18. The process of claim 10 in which the homotelomerization is conducted in the presence of carbon tetrachloride as a solvent.

19. A process for the production of a distillable open chain homotelomer which comprises telomerizing a polymerizable perhalogenated ethylene at a temperature between about 0° C. and about 200° C. for a period of time between about ½ hour and about 24 hours under liquid phase and substantially anhydrous conditions with sulfuryl chloride as a telogen in a mol ratio between about 1:10 and about 2:1 with monomer in the presence of a catalyst effective under the conditions of telomerization to promote the telomerization in the presence of sulfur dioxide as a modifying agent in a mol ratio between about 1:10 and about 10:1 with the catalyst.

20. A process for the production of a distillable open chain cotelomer which comprises telomerizing a polymerizable compound containing a double bond between two carbon atoms and two fluorine atoms attached to at least one of the carbon atoms and another haloethylenic compound at a temperature between about 0° C. and about 200° C. for a period of time between about ½ hour and about 24 hours under liquid phase and substantially anhydrous conditions with sulfuryl chloride as a telogen in a mol ratio between about 1:10 and about 2:1 with monomer in the presence of a catalyst effective under the conditions of telomerization to promote the telomerization in the presence of sulfur dioxide as a modifying agent in a mol ratio between about 1:10 and about 10:1 with the catalyst.

21. The process of claim 20 in which trifluorochloroethylene is cotelomerized with tetrafluoroethylene.

22. A process for the production of a distillable open chain telomer which comprises telomerizing a halogenated ethylene at a temperature between about 25° C. and about 150° C. for a period of time between about 1 hour and about 6 hours under liquid phase and substantially anhydrous conditions with sulfuryl chloride as a telogen in a mol ratio between about 1:1 and about 1:4 with monomer in the presence of benzoyl peroxide as a catalyst to promote the telomerization in the presence of sulfur dioxide as a modifying agent in a mol ratio between about 1:3 and about 3:1 with the catalyst to produce a distillable open chain even numbered carbon atom telomer containing chlorine end groups and recovering the telomer thus produced as the product of the process.

23. A process for the production of distillable open chain homotelomers which comprises telomerizing chlorotrifluoroethylene at a temperature between about 80° C. and about 125° C. for a period of time between about 2 hours and 5 hours under liquid phase and anhydrous conditions with sulfuryl chloride as a telogen in the presence of benzoyl peroxide as a catalyst and sulfur dioxide as a modifying agent in a mol ratio between about 1:3 and about 3:1 with the catalyst, said sulfuryl halide being in a mol ratio between about 1:1 and about 1:4 with the monomer.

References Cited in the file of this patent

UNITED STATES PATENTS

| | | |
|---|---|---|
| 2,192,467 | Frey | Mar. 5, 1940 |
| 2,411,722 | Harmon | Nov. 26, 1946 |
| 2,423,497 | Harmon | July 8, 1947 |
| 2,440,800 | Hanford et al. | May 4, 1948 |

FOREIGN PATENTS

| | | |
|---|---|---|
| 581,899 | Great Britain | Oct. 29, 1946 |

OTHER REFERENCES

Yakuborich et al.: J. Gen. Chem. (U. S. S. R.) 17, 2028–47 (1947); abstracted in C. A. 43, 1248–9.

Ultee: Rec. Trav. Chem. 68, 125–137 (1949); abstracted in C. A. 43, 5362–3.